United States Patent [19]

Barden et al.

[11] Patent Number: 5,031,721

[45] Date of Patent: Jul. 16, 1991

[54] SOUND ABSORPTION BARRIERS

[75] Inventors: Ronald Barden, East Kew; Philip J. West, Kew, both of Australia

[73] Assignee: Road Construction Authority, Victoria, Australia

[21] Appl. No.: 347,218

[22] Filed: May 4, 1989

[30] Foreign Application Priority Data

May 4, 1988 [AU] Australia ................................ PI8046

[51] Int. Cl.[5] ......................... B64F 1/26; E04H 17/00; G10K 11/00

[52] U.S. Cl. ...................................... 181/210; 181/290

[58] Field of Search ............... 181/210, 290, 291, 288, 181/293; 52/145

[56] References Cited

U.S. PATENT DOCUMENTS

| | | | |
|---|---|---|---|
| 3,007,539 | 11/1961 | Brewer et al. | 181/210 X |
| 3,534,829 | 10/1970 | Schneider | 181/290 |
| 3,630,310 | 12/1971 | Federer | 181/210 |
| 3,961,682 | 6/1976 | Deusch et al. | 181/290 |
| 4,042,061 | 8/1977 | Murakami | 181/290 X |
| 4,057,123 | 11/1977 | Erickson | 181/290 X |
| 4,064,960 | 12/1977 | Murakami | 181/290 X |
| 4,193,474 | 3/1980 | Okubo et al. | 181/290 X |
| 4,274,506 | 6/1981 | Blomgren et al. | 181/210 |
| 4,611,687 | 9/1986 | Nixon | 181/288 X |

FOREIGN PATENT DOCUMENTS 3131104 2/1983 Fed. Rep. of Germany ............ 260/

*Primary Examiner*—Brian W. Brown
*Attorney, Agent, or Firm*—Antonelli, Terry, Stout & Kraus

[57] ABSTRACT

A sound barrier member for enabling a sound barrier providing good prevention of sound transmission sound reflection. The sound barrier member comprises an enclosure in a generally panel like configuration having a rectangular outer perimeter adapted to engage with other similar members to produce a sound barrier. The enclosure is formed by a front panel (10) and a rear panel unit (16) defining an enclosed space therebetween, with the front panel (10) having a plurality of openings (12) in a desired shape and array allowing sound transmission into the enclosed space. A sound absorbing material (25) is positioned in the enclosed space overlying at least the openings in the front panel (10) and being spaced forwardly of the rear panel unit (16). The sound absorbing material (25) has at least one sound absorbing batt (28,29) of fiberglass mat construction and a layer of solid plastics material (31) on a rearward face of at least one batt whereby a space is left between the layer of solid plastics material and the rear panel unit (16).

13 Claims, 6 Drawing Sheets

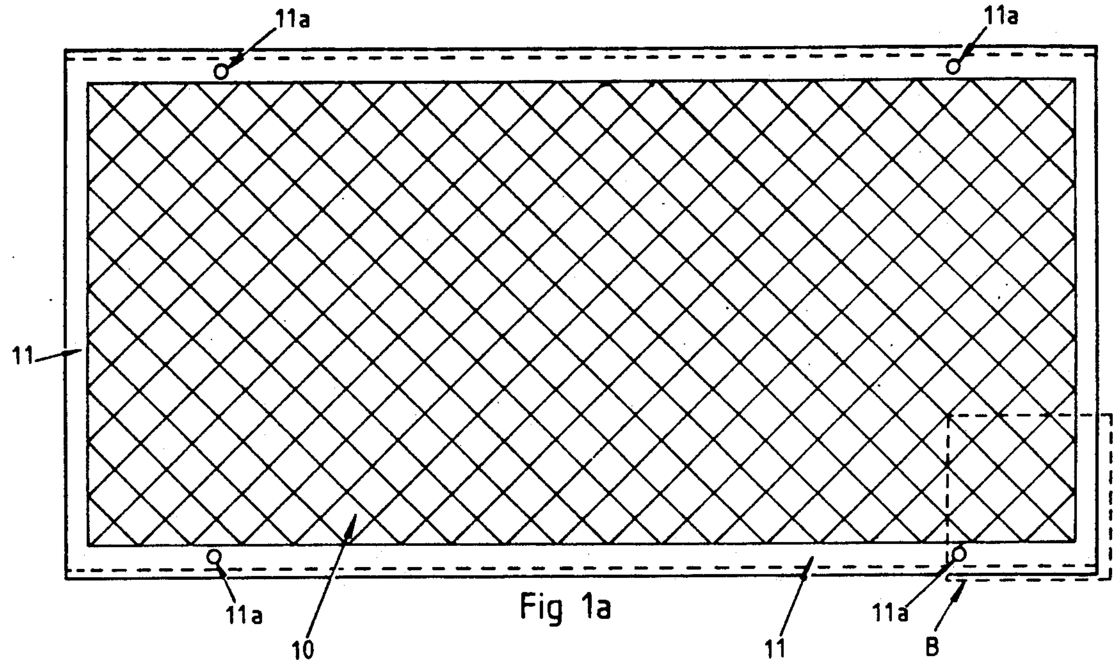
Fig 1a
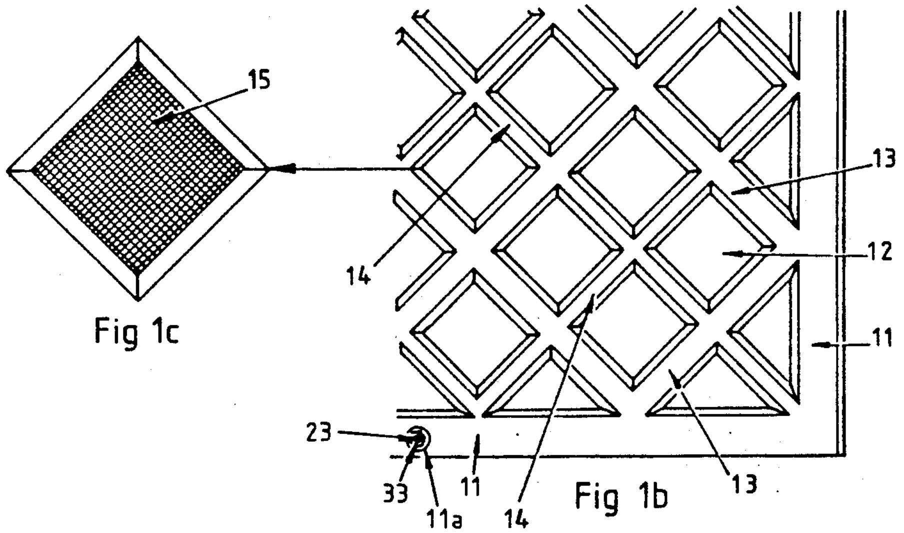
Fig 1c
Fig 1b

SOUND ABSORPTION BARRIERS

BACKGROUND OF THE INVENTION

The present invention relates to sound absorption barriers and, more particularly, to an improved panel construction adapted, in association with other similar panels, to form a sound absorption barrier. The present invention has been developed particularly for use in controlling noise generated by road or other ground transport machines but it will be apparent from the following that the invention could well be used in other applications. Situations other than adjacent roadways where the invention could be employed include industrial applications where noisy machines are used, enclosures around generators, sound barriers at airports and adjacent railway lines. Again, this list should not be regarded as exhaustive.

Unwanted sound is commonly referred to as noise. This can take the form of aircraft noise, train noise, motor vehicle noise and even loud music can be noise to some people. The level where sound becomes noise can be very subjective. At a certain level some individuals can be severely affected while other people may not react until the noise level becomes much greater. Road traffic noise generated by cars, trucks and motorcycles can take two main forms, continuous background noise and individual vehicle noise. Noise associated with heavily trafficked freeways and arterial roads is a mix of many sources, and is mainly continuous bulk traffic noise with an overlay of individual noisy vehicles.

The object of the present invention is to create a panel adapted for use in a barrier which will absorb noise from any desired location and will not reflect such noise to any significant extent while reducing such transmitted noise.

Plain, hard, dense noise barriers inserted between the noise source and the receiver, tend to reduce the transmission of noise between the source and the receiver. The insertion loss is not only dependent upon the barrier density but also the barrier height and length. The barrier integrity is important, as porous or badly joined barriers will leak noise, increasing the level at the receiver. A well constructed hard barrier will reflect traffic noise back towards and beyond the motor vehicle source. In some circumstances this may increase the noise levels at a second receiver opposite the noise barrier across the arterial road or freeway. If this occurs it may be necessary to erect a second noise barrier to protect the second receiver, resulting in parallel barriers on the sides of the roadway. The presence of high parallel reflective barriers adjacent to the roadway, can cause the multiple reflection of traffic noise between the barriers. In some circumstances the noise levels between the barriers could be higher than noise levels at the source without the barriers. If the noise level at the source is effectively increased then the noise level at the receiver will be proportionately increased. What this means, is that the erection of a second barrier will be detrimental to the receiver behind the first barrier which shields it from direct traffic noise.

The reduction of the reflection capabilities of a noise barrier will lower noise levels opposite the barrier in the single barrier situation and the noise levels on both sides of the road in the parallel barrier situation. Reducing the reflection potential of a barrier involves increasing the absorption qualities of that barrier. An absorptive barrier must also be dense enough to achieve an effective sound transmission loss through it.

Noise absorption and to a much lesser degree noise reflection is frequency dependent. Absorption co-efficients are expressed in a range of 0.0 to 1.0 at a specific frequency, normally octave or third octave points. Traffic noise is louder in the low frequency range of 100 Hz to 1000 Hz, so for an absorption barrier to be effective it must perform very well in this range.

The principle function of a sound barrier, particularly for use adjacent roadways or the like, is to attenuate noise between the source and a receiver while minimizing or proventing reflection of the noise. In achieving this basic requirement it is of course also desirable to achieve a sound barrier which is relatively inexpensive to produce, durable, maintenance free, aesthetically acceptable and has high absorption coefficients at low frequencies.

SUMMARY OF THE INVENTION

The present invention aims at providing an acoustic barrier member which, with other similar members, is adapted to form a sound barrier separating a receiver from a noise source. According to a first aspect of the present invention, there is provided an acoustic barrier member comprising an enclosure having a front panel member which has a least one open area that, in use, is adapted to face toward a noise source, and a continuous rear panel member spaced rearwardly from the front panel member, with the barrier further including a sound absorbing material arranged within enclosure overlying the open area or areas of front panel member and being located such that a rear face of the sound absorbing material is spaced forwardly of an inner rear face of the rear panel member of the enclosure.

According to a second aspect of the present invention, there is provided an acoustic barrier member comprising an enclosure having a front panel member which has at least one open area that, in use, is adapted to face toward a noise source, and a continuous rear panel member spaced rearwardly from said front panel member, said barrier member further including a sound absorbing material comprising at least one sound absorbing batt with a layer of solid plastics material arranged adjacent a rearwardly directed face of the at least one sound absorbing batt such that a the sound absorbing batt faces toward the front panel member of the enclosure. The sound absorbing material is arranged within the enclosure overlying the open area or areas of the front panel member and is located such that a rear face of the sound absorbing material is spaced forwardly of an inner rear face of the rear panel member of the enclosure. The invention in providing an open front wall, a closed rear wall and sound absorbing material in spaced relation therebetween achieves a high degree of prevention of sound transmission and sound reflection. Conveniently, the rigid plastics material layer is polyvinyl chloride at least the like and is adhered to the or the one sound absorbing batt. Advantangeously, a the rigid plastic material layer is adhered to each of the sound absorbing batts. In a preferred arrangement the sound absorbing material may be at least as large as the internal dimensions of the enclosure forming the panel. In a further preferred arrangement, a forward face of the sound absorbing material is spaced rearwardly of the front face of the enclosure. In this manner, air gaps are formed between the sound absorbing material and the rear face of the enclosure or between the sound absorbing material and both the front and rear faces of the enclosure.

In accordance with a further preferred arrangement, the sound absorbing material may comprise at least two fiberglass sound absorbing batts with a layer of substantially rigid polyvinyl chloride located therebetween. Conveniently the sound absorbing material may comprise two fiberglass sound absorbing batts, each with a layer of polyvinyl chloride adhered to one face of the batt, with the two batts being so arranged that the layers of polyvinyl chloride are adjacent one another. Preferably the enclosure is formed by moulding a glass fiber reinforced cement (GRC). Conveniently the enclosure is moulded in two parts with the front face being formed separately from the rear face. The rear face may be moulded integrally with forwardly extending side, top and bottom edge walls, with the front face being moulded separately and securable to the side, top and bottom edge walls to complete the enclosure.

The open area of the front face is preferably at least 10% of the total area of the front face and, preferably, is about 40% of the total area. The maximum open area is dependent upon mechanical design constraints for the panel itself but might be up to 60%. Conveniently the open area may be comprised of a plurality of discrete spaced openings in the front face. The openings may have a diamond shape. Preferably, a fine mesh material may cover the openings inwardly of the enclosure to prevent or minimize the entry of contaminants such as dust, water, insects or the like.

BRIEF DESCRIPTION OF THE DRAWING

The invention will now be described with reference to the accompanying drawings which illustrate one particularly preferred embodiment adapted to form a sound barrier adjacent roadways wherein.

FIG. 1*a* is a schematic front elevation of a front section of a panel produced according to a preferred embodiment of the present invention;

FIG. 1*b* is a detail view of the area marked B in FIG. 1*a*;

FIG. 1*c* is a further detail view of part of FIG. 1*b*;

DETAILED DESCRIPTION

Figure 2D:
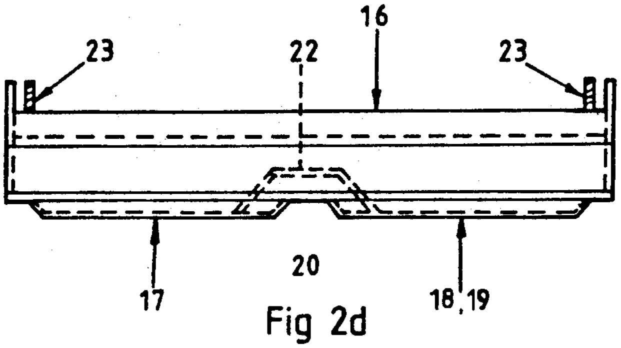
FIG. 2*d* is an end elevation view of the rear section shown in FIG. 2*a*.

Referring to the drawings, the preferred noise barrier panel is constructed of three main component, with the first component being a front panel 10 which is an open lattice constructed from GRC. The basic overall dimensions may be 1990 mm×980 mm while the front depth of the panel 10 will vary according to the overall dimensions which then is dependent upon the application.

The front panel 10 has been arranged with a surrounding solid frame 11 and a plurality of openings 12 along the diagonals in the panel (FIG. 1*a*). The solid diagonal GRC struts 13,14 alternate from about 20 mm to about 25 mm, and increase in width with the depth of the panel (FIG. 1*b*). These dimensions are variable and future lattice designs may have the struts being a uniform size or the alternate strut 13 being much greater than the narrow strut 14. Holes 11*a* provide a recess for the nuts 33 that are attached to bolts 23 moulded into a rear panel unit 16. The nuts 33 threadably engaged on the bolts 23 secure the front panel 10 to the rear panel unit 16.

The open area of the panel 10 should be at least 10% and, preferably, about 40%, while the individual openings 12 are diamond or square/rectangular in shape measuring 45 mm×45 mm having bevel edges on the front of the panel 10, while the opening is slightly bevelled at a much lesser angle through the depth of the panel 10. The thickness of the front panel 10 is dependent on the designed open area and strength. A suitable range may be between 10 mm and 20 mm. The percentage open area and the openings dimension may vary according to barrier application.

A mesh 15, for example, a plastic fly mesh may be glued to the rear of the front panel 10. The mesh 15 serves two purposes. It reduces the amount of rain and water splash entering the barrier and also reduces the opportunity for nesting insects and birds to enter the panel.

As shown in FIGS. 2*a*–3*b*, the rear and side sections of the barrier are moulded in a single unit 16 from glass fiber reinforced cement (GCR). Basically the overall dimensions may be 1990 mm×1000 mm with a maximum cross-sectional depth of 230 mm. The GRC material may be a nominal 10 mm in thickness.

Figure 2C:
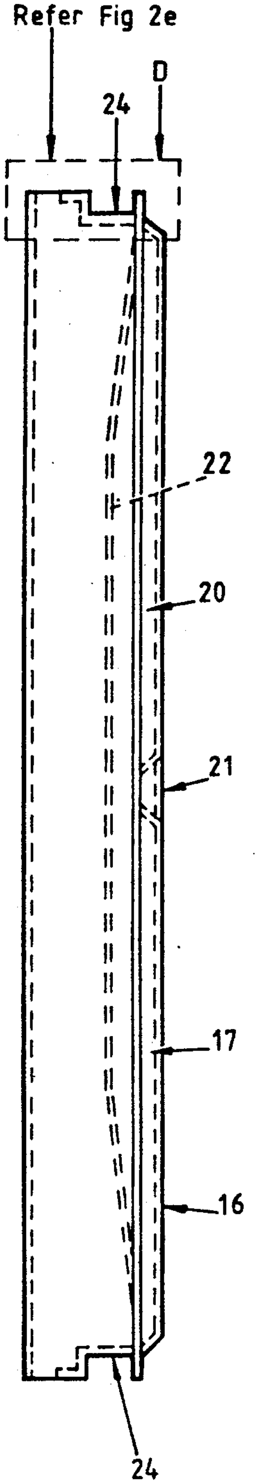
FIG. 2*c* is a top plan view of the rear section shown in FIG. 2*a*.
Figure 2A:
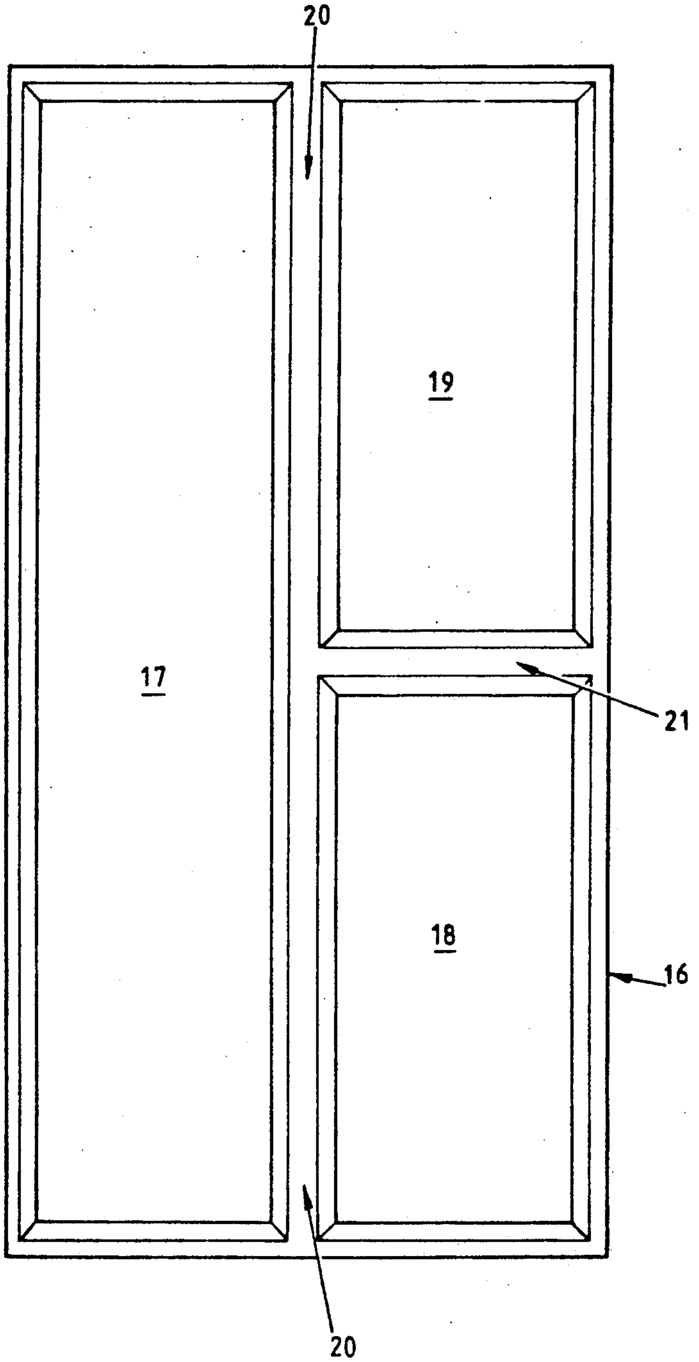
FIG. 2*a* and 2*b* are outer elevation views of rear section of panels adapted to co-coperate with the front section shown in FIG. 1*a*.

FIG. 2*a* gives an overall impression of the architectural treatment of the rear panel and the size of the individual components in the panel treatment. The rear outer surface of the unit 16 has preferably three upraised panels 17, 18 and 19 separated by grooves 20 and 21.

Figure 2B:
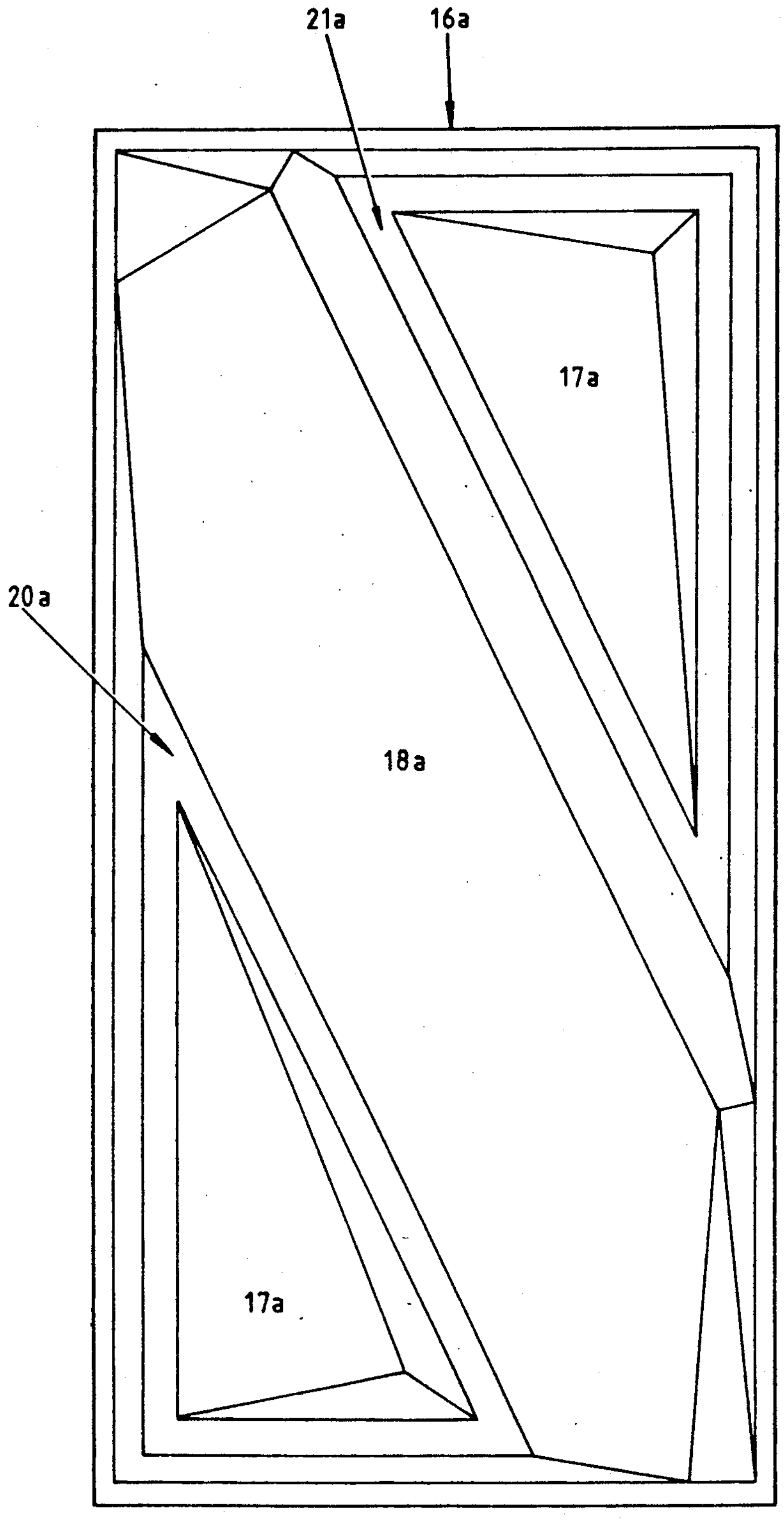

FIG. 2*b* gives an overall impression of an alternative architectural treatment of the rear panel and size of the individual components in the panel treatment. The rear outer surface of the unit 16*a* has three upraised prismoidal sections 17*a* and 18*a* separated by grooves 20*a* and 21*a*. Other alternative rear panel treatments of the rear panel unit will be used from time to time depending on the panels application.

Figure 3A:
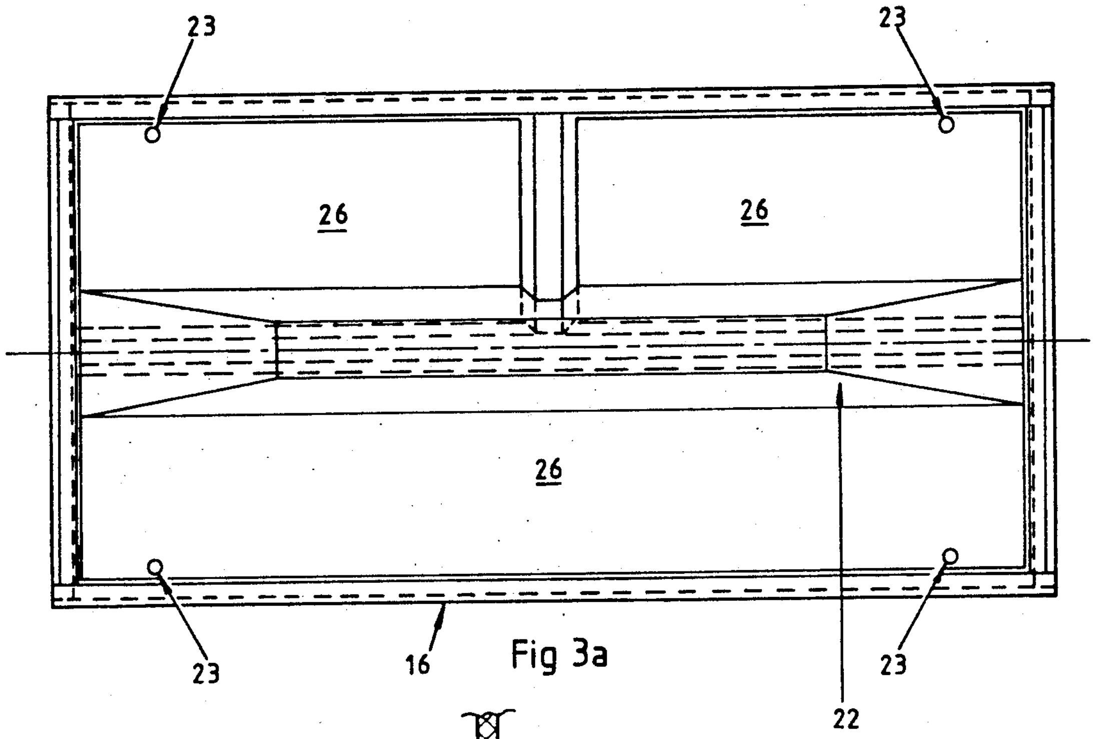
FIG. 3*a* is an inside elevation view of the rear section shown in FIG. 2*a*.
Figure 3B:
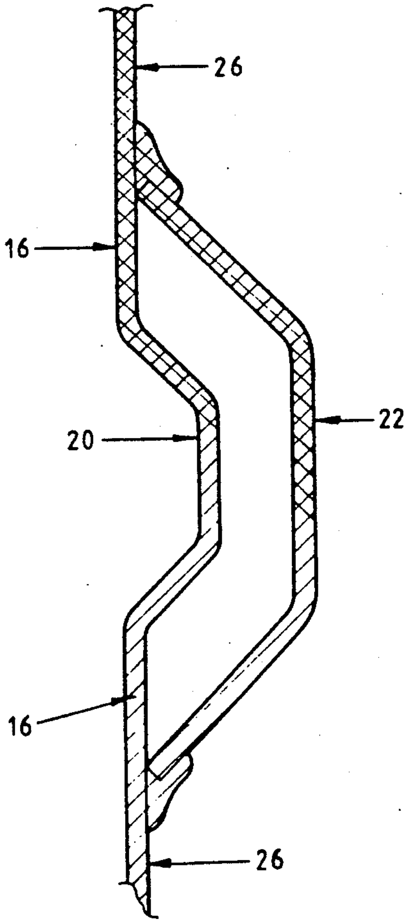
FIG. 3*b* is a cross-sectional detail view of a reinforcing element included in the rear section construction.

FIG. 2*c* shows the top elevation and the relative size of an internal reinforcing component 22 shown in more detail in FIGS. 3*a* and 3*b*. The end elevation, FIG. 2*c* demonstrate where the front panel 10 attaches on to the rear panel unit 16 using the bolts 23. In this manner the front panel 10 is secured to the rear unit 16.

Figure 2E:
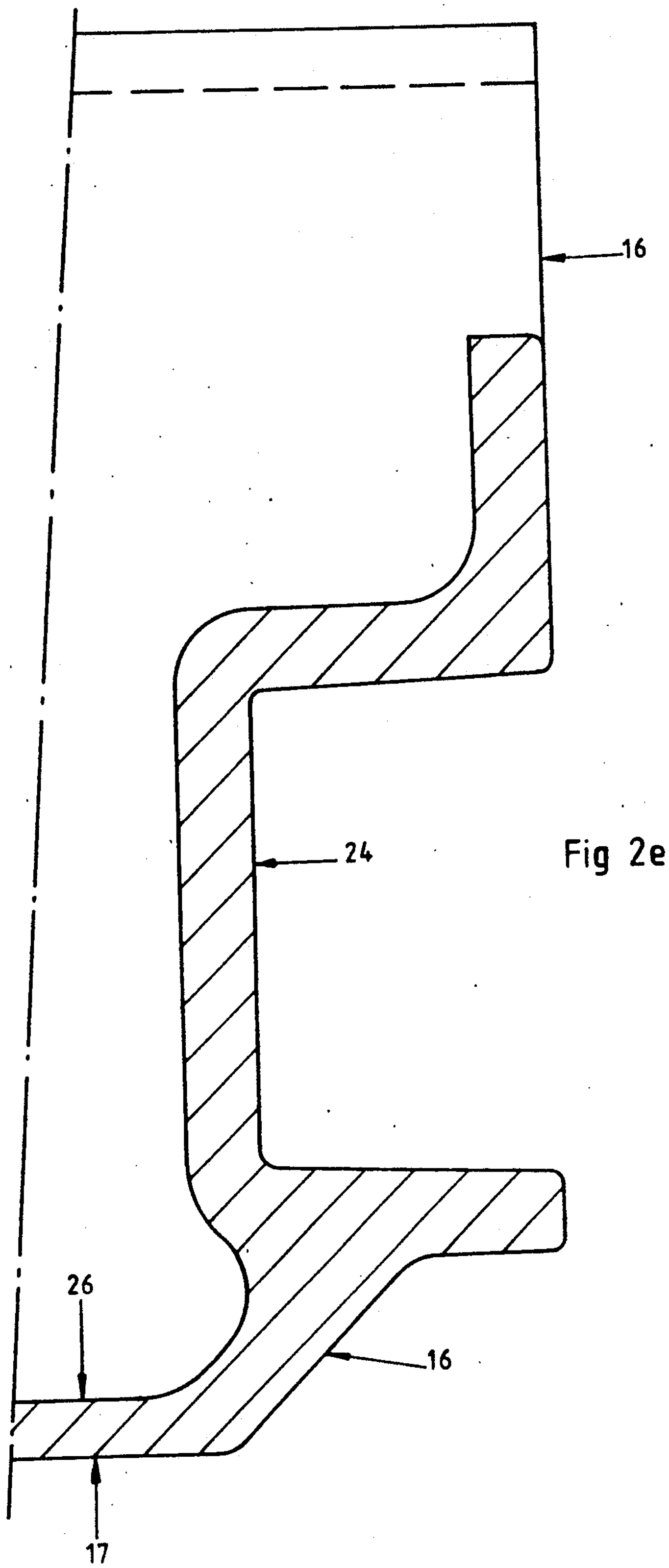
FIG. 2*e* is a detailed sectional view of the area marked D in FIG. 2*c*.

An end post slot 24 is shown in FIGS. 2*c* and 2*e*. The size of the moulded slot 24 will vary according to the size of the support post. The higher the barrier the larger the post cross-section, so the larger the slot. The configuration shown in FIG. 2*e* is designed for a 2 m high barrier supported by a 76 mm×76 mm galvanized square post. In use, a plurality of noise barrier panels are supported one on the other between two support posts. The length of the barrier is increased by arranging more support posts with panels located therebetween.

The reinforcing channel 22 attached to the center of the rear unit 16 is shown in FIGS. 3*a* and 3*b*. This channel is moulded independently of the rear unit 16 and is attached when the rear unit 16 is being moulded. The channel 22 reinforces the unit 16 and assists in locating the sound absorbing unit 25 away from the rear internal surface 26 so that a cavity 27 is created. The cavity 27 enhances the acoustic performance at mid to high frequencies. The size of the cavity is believed not to be too critical although a spacing of at least 50 mm is currently regarded as optimal. The uniformity of the cavity 27 is not essential and spacings greater than 50 mm will not change the performance characteristics greatly.

Figure 4:
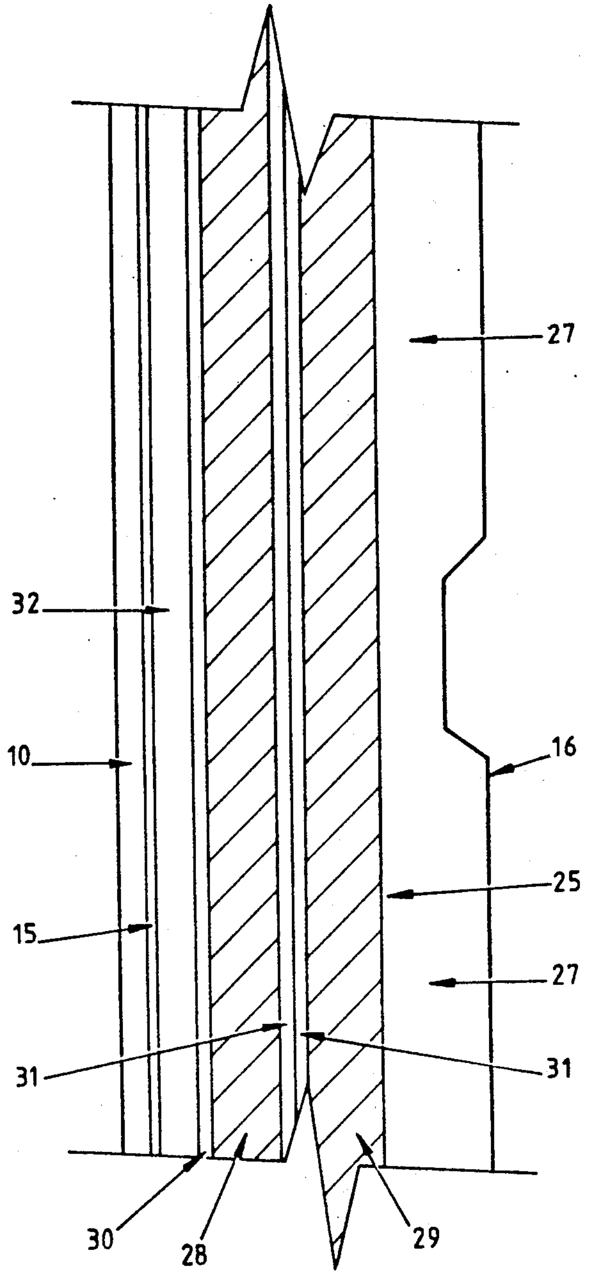
FIG. 4 is a cross-sectional view showing schematically the transverse location of the various elements making up the sound absorption panel.

The sound absorbing component or unit 25 is best seen in FIG. 4. Preferably the unit 25 includes two batts 28,29 of fiberglass mat construction sandwiching a thin sheet, and located inside the enclosure formed by the front panel 10 and the rear unit 16.

The sound absorbing fiber batts 28,29 may be 50 mm thick and have a nominal density of between about 32 to 35 kg/m$^3$. This dimension and density range are standardly produced and commonly available having acoustic performance characteristics that are adequate for the present purposes. The acoustic performance will drop if the density or thickness is less than the foregoing figures. The front batt 28 may have a scrim 30 glued to the surface facing the front lattice panel 10. This scrim 30 is used to reduce the amount of rain water penetrating the front batt 28.

The rear batt 29 has a substantially rigid 400 $\mu$m thick PVC sheet 31 glued to the surface facing the front batt. A plastics sheet thicker than 400 $\mu$m may be more expensive but not add greatly to the acoustic performance of the panel. The sheet 31 acts as a low frequency absorber as well as providing a small amount of rigidity to the overall sound absorbing components 25.

The sound absorbing components 25 are located firmly in the rear panel unit 16 by being slightly larger than the internal dimensions. The overall dimensions of the sound absorbing components 25 may vary depending upon the barrier application. The arrangement is also such as to preferably provide an air space or cavity 32 between the front batt 28 and the front panel 10 to assist in improving rain resistance.

Road traffic noise tends to predominate in the frequency range of 100 Hz to 1000 Hz, then decreases in loudness upwards from 1000 Hz. Traffic noise loudness varies depending upon the road surface and the vehicle mix, as well as the source and receiver exposure.

Most previous designs of absorbing barriers have been constructed of materials other than GRC, for example, fiberglass composites or metal sheet. These barriers require on-going maintenance, and may eventually deteriorate to a stage where the barrier needs to be replaced. Many of these barriers have been designed on a fundamental performance basis rather than a performance and aesthetic concept. The barrier described hereinabove is designed to be long-lasting, maintenace free and aesthetically appealing.

What is claimed is:

1. An acoustic barrier member comprising a rigid enclosure having a front panel member with at least one open area adapted to face a noise source, a continuous rear panel member spaced rearwardly from said front panel, sound absorbing material comprising at least one sound absorbing batt, and a layer of solid non-perforated plastics material arranged adjacent a rearwardly directed face of the at least one sound absorbing batt such that a forwardly directed face of said at least one sound absorbing batt faces toward the front panel of said enclosure, and wherein said at least one sound absorbing batt is arranged within said enclosure overlying the at least one open area of said front panel member and is located such that the rearwardly directed face of the at least one sound absorbing batt is spaced forwardly of an inner rear face of the rear panel member of the enclosure so as to provide an air gap therebetween.

2. An acoustic barrier member according to claim 1, wherein said enclosure is formed from moulded glass fiber reinforced cement.

3. An acoustic barrier member according to claim 1, wherein said solid plastics material is polyvinyl chloride.

4. An acoustic barrier member according to claim 1, wherein said solid plastics material is adhered to said at least one sound absorbing batt.

5. An acoustic barrier member according to claim 1, wherein said sound absorbing material has a surface area at least as large as internal dimensions of said enclosure.

6. An acoustic barrier member according to claim 1, wherein the forwardly directed face of said at least one sound absorbing batt is spaced rearwardly from an inner face of said front panel member.

7. An acoustic barrier member according to claim 1, wherein said sound absorbing material comprises two sound absorbing batts formed from fiberglass, and said solid plastics material is located between said two sound absorbing batts.

8. An acoustic barrier member according to claim 1, wherein said front panel member includes a plurality of openings forming said at least one open area whereby a total open area of said front panel member is between 10% and 60% of a total area of said front panel member.

9. An acoustic barrier member according to claim 8, wherein said plurality of openings are diamond shaped.

10. An acoustic barrier member according to claim 8, wherein a fine mesh material is secured to or disposed adjacent an inner face of said front panel member.

11. An acoustic barrier member according to claim 1, wherein a water repellent material is applied to a front face of said sound absorbing material.

12. An acoustic barrier member comprising a rigid enclosure having a front panel member with at least one open area adapted to face toward a noise source, a continuous rear panel member spaced rearwardly from said front panel, sound absorbing material comprising a pair of sound absorbing batts, a layer of solid plastics material adhered to each said pair of sound absorbing batts, with the respective layers of solid plastics material being in contact with one another such that a forwardly directed face of one of said pair of sound absorbing batts faces toward the front panel member of said enclosure, and wherein said pair of sound absorbing batts are arranged within said enclosure overlying the at least one open area of said front panel member and are located such that a rearwardly directed face of the other of said pair of sound absorbing batts is spaced forwardly of an inner rear face of the rear panel member of the enclosure.

13. An acoustic barrier member comprising a rigid enclosure having a front panel member with at least one open area adapted to face toward a noise source, a continuous rear panel member spaced rearwardly from said front panel member, sound absorbing material comprising at least one sound absorbing batt, and a layer of solid non-perforated plastics material arranged adjacent a rearwardly directed face of the at least one sound absorbing batt such that a forwardly directed face of said at least one sound absorbing batt faces toward the front panel member of said enclosure, said at least one sound absorbing batt is arranged within said enclosure overlying the at least one open area of said front panel member and is located such that the rearwardly directed face of the at least one sound absorbing batt is spaced from an inner rear face of the rear panel member of the enclosure, and wherein the inner rear face of the rear panel member includes angular protuberances arranged to reflect noise directed towards said inner rear face in either an upward or a downward direction.

* * * * *